United States Patent Office 2,700,864
Patented Feb. 1, 1955

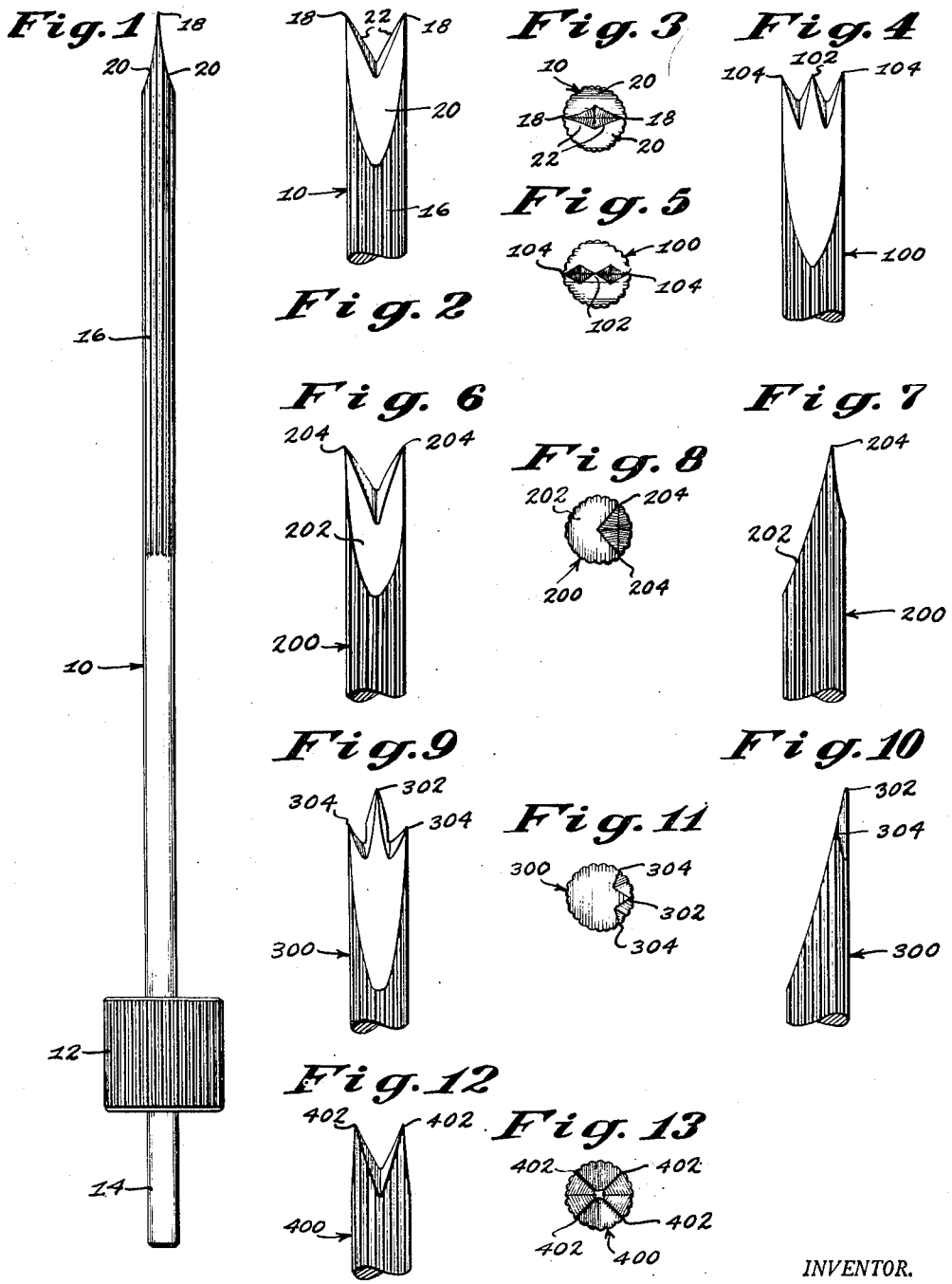

2,700,864

COTTON PICKER SPINDLE

John A. Fogle, Neeses, S. C.

Application March 2, 1954, Serial No. 413,534

2 Claims. (Cl. 56—50)

This invention relates to cotton picker spindles such as are used in cotton picking machines as the active cotton picking elements, and more particularly to an improved form of spindle by which the efficiency of the cotton picking operation can be maintained substantially more consistent despite variations in the condition of the crop to be picked.

Cotton picker spindles of the type with which the present invention is concerned operate by engaging the growing cotton in the boll and withdrawing it therefrom by winding onto the spindles as a result of rotation of the spindles about their principal axis. After the cotton has been taken onto the spindles in this way, it is automatically stripped in the cotton picking machine from the spindles and accumulated for delivery to be processed further. Cotton picking machines arranged with spindles of this sort are disclosed, for example, in U. S. Patents No. 1,894,198, and No. 2,058,513.

In order for the spindles to pick the cotton effectively, they must be sufficiently aggressive to engage the growing cotton readily as the cotton picking machine moves through the crop rows. However, because the picked cotton must also strip easily from the spindles for efficient operation of the machine, it has been found highly disadvantageous to allow the aggressiveness of the spindle to interfere with its ease of stripping. For this reason, a commonly used form of spindle is one arranged with an active cotton picking length of entirely uniform cylindrical cross section and having the peripheral surface thereof roughened only by small longitudinal ribs that have the effect of presenting a knurled surface. This type of spindle has excellent stripping properties and exceedingly good picking action under favorable crop conditions. Where adverse weather or other circumstances have impaired the condition of the crop, however, more aggressiveness is needed than a spindle of this type provides in order to obtain a satisfactory picking efficiency.

According to the present invention, I have found that all of the advantages of the above noted type of longitudinally ribbed spindle can be retained while substantially improving its aggressiveness by relieving the active end face thereof to form a plurality of barb points spaced at the periphery of the spindle cross section, as described in detail below in connection with the accompanying drawings, in which:

Fig. 1 is an elevation of a cotton picker spindle embodying the present invention;

Fig. 2 is an enlarged fragmentary elevation of the active spindle end rotated 90° with respect to Fig. 1;

Fig. 3 is a top plan view corresponding to Fig. 2;

Fig. 4 is a fragmentary elevation of an active spindle end corresponding generally to Fig. 2, but showing a modified embodiment of the present invention;

Fig. 5 is a top plan view corresponding to Fig. 4;

Fig. 6 is a fragmentary elevation of an active spindle end corresponding generally to Fig. 2, but showing a further modified embodiment of the present invention;

Fig. 7 is a fragmentary elevation corresponding to Fig. 6 but rotated 90°;

Fig. 8 is a top plan view corresponding to Fig. 7;

Fig. 9 is a fragmentary elevation of an active spindle end corresponding generally to Fig. 2, but showing another modified embodiment of the present invention;

Fig. 10 is a fragmentary elevation corresponding to Fig. 9 but rotated 90°;

Fig. 11 is a top plan view corresponding to Fig. 10;

Fig. 12 is a fragmentary elevation of an active spindle end corresponding generally to Fig. 2, but showing still another modified embodiment of the present invention; and Fig. 13 is a top plan view corresponding to Fig. 12.

Referring now in detail to the drawings, Fig. 1 shows a cotton picker spindle 10 formed with a drive roller 12 and having a bearing shank 14 extending below the roller 12 for installation in a cotton picking machine in the manner disclosed by U. S. Patent No. 2,440,450. In this spindle 10, longitudinal ribs 16 are preferably formed on the spindle body periphery at its active end portion, as previously mentioned, although this ribbing 16 is not essential according to the present invention and may be omitted if desired. However, the active end portion of the spindle body 10 is in any case formed according to the present invention with a uniform cylindrical cross section except at the end face which is relieved to form spaced barb points 18 at the periphery of the spindle body cross section (compare Figs. 2 and 3).

These barb points 18 are formed on tapered barbs disposed entirely within the spindle cross section by relieving the active spindle end at beveled planes or the like (i. e., substantially plane, angularly related, surfaces having a plurality of points of intersection lying at the periphery of the spindle body cross section) such as are indicated in Figs. 1, 2 and 3 at 20 and 22, the planes or surfaces 20 being arranged to taper the active spindle end at portions of its periphery and the surfaces 22 serving to relieve the end face of the spindle transversely with respect to the surfaces 20, so that the barbs 18 taper toward the active spindle end to their points located at the spindle periphery. The result of this arrangement is to provide an active spindle end that is exceptionally effective in engaging the growing cotton, and that winds the engaged cotton readily onto itself because of the spaced arrangement of the barbs 18; but which arrangement does not lessen in any way the ease with which the picked cotton may be stripped from the spindles 10, because the barb points 18 are formed entirely within the periphery of the uniform spindle cross section and taper towards the active spindle end so that no resistance whatever to stripping is introduced.

The above described arrangement of the spindle 10 with spaced barb points 18 in accordance with the present invention also affords the further substantial advantage of tending to maintain the picked cotton bunched closely adjacent the active spindle end as it is wound thereon so as not only to facilitate stripping of the picked cotton from the spindles but also to reduce substantially the spindle length with which the picked cotton has contact and thereby materially lessen the opportunity for soiling the cotton from the spindles.

The remaining illustrations in the drawings show modifications incorporating the present invention in varied forms to obtain its benefit while affording latitude in the precise details of the embodiment for selection in relation to such factors as ease of manufacture, maintenance difficulties, and other general service considerations. Figs. 4 and 5 show an active spindle end 100 similar to that of the embodiment 10, but in which a centrally disposed barb 102 is formed in addition to spaced barbs 104 at the periphery of the spindle cross section. In this spindle embodiment 100 the tapered barbs are not as long and would therefore be stronger under some circumstances, and the centrally disposed barb 102 supplements the cotton engaging and winding action of the spaced peripheral barbs 104.

Figs. 6, 7 and 8, show a further modified active spindle end 200 similar to the first described embodiment 10, but formed with only one major beveled plane as at 202 so as to arrange the spaced barb points 204 sidewise at the active spindle end 200 in a manner that simplifies the pattern in which the spindle end is relieved.

Figs. 9, 10 and 11 show another modified embodiment of the present invention in which an active spindle end 300 is formed like the embodiment 200 just described, but with a centrally disposed barb extending above a pair of smaller barbs 304 spaced at either side thereof, the sidewise disposition of the barbs resulting in disposing the central barb 302 as well as the barbs 304 spaced therefrom at the periphery of the spindle cross section.

Figs. 12 and 13 illustrate still another embodiment of the present invention in which an active spindle end 400 has the end face thereof relieved symmetrically at right angles to form four regularly spaced peripheral barbs 402 thereat.

The present invention has been described in detail above for purposes of illustration only and is not intended to be limited by this description or otherwise except as defined in the appended claims.

I claim:

1. A cotton picker spindle comprising a spindle body in which the active cotton picking length thereof is of uniform cylindrical cross section except adjacent its extending active end at which said spindle body has a portion of the periphery thereof tapered at at least one substantially plane surface and has the end face thereof relieved transversely with respect to said tapered surface to define a plurality of tapered barbs disposed within the cylindrical cross section of said active spindle body length, tapering toward said extending active end, and having the points thereof spaced at the circumference of said cylindrical cross section.

2. A cotton picker spindle comprising a spindle body having an active cotton picking length of uniform cylindrical cross section except adjacent the extending active end thereof, the portion of said spindle body adjacent said active end being relieved at a plurality of substantially plane, angularly related, surfaces having a plurality of points of intersection lying at the periphery of said cylindrical cross section and thereby defining a plurality of tapered barbs disposed within the cylindrical cross section of said active spindle body length, tapering toward said extending active end, and having the points thereof spaced at the periphery of said cylindrical cross section.

References Cited in the file of this patent

UNITED STATES PATENTS

| Number | Name | Date |
|---|---|---|
| 386,262 | Pedersen | July 17, 1888 |
| 452,555 | Pfleghar | May 19, 1891 |
| 555,118 | Pickering | Feb. 25, 1896 |
| 791,393 | Abbott | May 30, 1905 |
| 918,902 | Pierce | Apr. 20, 1909 |
| 964,393 | Clark | July 12, 1910 |
| 1,854,413 | Myercord et al. | Apr. 19, 1932 |
| 1,931,773 | Sobol | Oct. 24, 1933 |
| 2,109,506 | Rust | Mar. 1, 1938 |
| 2,258,326 | Holt | Oct. 7, 1941 |
| 2,470,282 | Baker et al. | May 17, 1949 |
| 2,512,109 | Lucius | June 20, 1950 |
| 2,645,892 | Weems | July 21, 1953 |